R. M. BUCHANAN.
Vehicle-Wheels.
No. 149,716.
Patented April 14, 1874.
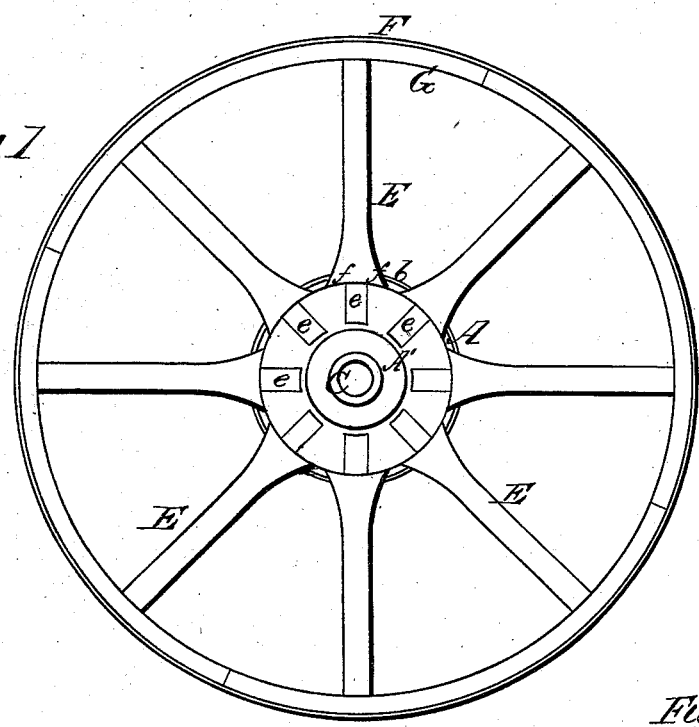
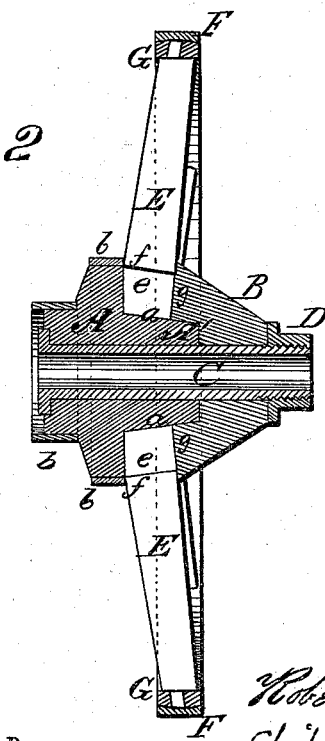
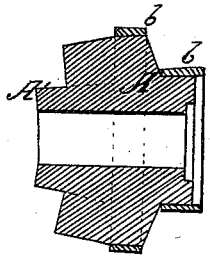
WITNESSES
INVENTOR
Robert M. Buchanan,
By Chipman Hosmer & Co.
ATTORNEYS.

UNITED STATES PATENT OFFICE.

ROBERT M. BUCHANAN, OF OKOLONA, MISSISSIPPI.

IMPROVEMENT IN VEHICLE-WHEELS.

Specification forming part of Letters Patent No. 149,716, dated April 14, 1874; application filed March 25, 1874.

*To all whom it may concern:*

Be it known that I, ROBERT M. BUCHANAN, of Okolona, in the county of Chickasaw and State of Mississippi, have invented a new and valuable Improvement in Wheels; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a side view of my wheel. Fig. 2 is a sectional view of the same, and Fig. 3 is a detail view.

This invention has relation to wheels for vehicles and other purposes, which are composed of spokes, fastened into fellies at their outer ends and mortised into a hub at their inner ends.

The object of my invention is to so construct a spoked wheel that in the act of inserting the spokes thereof into the hub and securing them in their places they will forcibly and uniformly expand the fellies or rim within the tire, and thus form a rigid and substantial wheel without the usual expensive and inconvenient process of cutting, heating, and shrinking on the tire, said wheel being also so constructed that any one or all of the spokes can be tightened should the same become loose from any cause, as will be hereinafter explained.

The following is a description of my invention:

In the annexed drawings, the letter A designates the hub of my improved wheel, which may be made of metal or other material. If this hub is made of wood, it should be suitably banded with iron, as indicated at *b b*. This hub consists of an enlarged circular flange, on one side of which mortises are made to receive the tenons *e* on the inner ends of the spokes E. This mortised portion presents a tapering or wedge-shaped periphery, and the mortises are cut into it in such manner that the spoke-tenons are introduced laterally into their places. The walls of the mortises are parallel to each other, and the tenons *e* are of greater width than the thickness of the mortised portion, and these tenons may be shorter than their mortises, for a purpose hereinafter explained. The spokes are shouldered at *f f*, and these shoulders may be perpendicular to the length of their respective spokes for a dished wheel, or the shoulders may be more or less beveled for a flat or slightly-dished wheel. The outer ends of the spokes E have round tenons formed on them, which are received into holes of corresponding shape made in the fellies G. The periphery of the fellies or rim is convex laterally, and is embraced by a tire, F, the inner surface of which is concave laterally. I thus prevent lateral displacement of the tire without the use of nails and clasps. A' is a circular concentric portion, which, like the mortised portion, is made tapering or wedge-form, the base of which concentric portion corresponds to the bottoms of the mortises. The end of the mortised portion of the hub is concave, and the exposed end of the concentric portion A is flat. When the fellies are applied in the tire F the outer tenoned ends of the spokes are inserted into the holes made for them in the fellies, and the inner tenoned ends of the spokes are inserted edgewise into their mortises in the hub and forcibly driven home therein. The shoulders *f f* of each spoke impinge on the tapered periphery of the mortised portion of the hub, so that in the act of driving the spokes to their places they will be moved outwardly, thereby expanding the fellies in the tire and making the wheel rigid and substantial. B designates a cap or washer, which is made concave to receive the concentric portion A' of the hub A, and which is centrally perforated to receive a metal tube, C, that has a head formed on its inner end, as shown in Fig. 2. This tube passes through the center eye of the hub and is screw-tapped on its outer end to receive the flanged nut D. The inner circular face of the cap B presents a convex surface, *g*, which corresponds to the concave surface formed in the exposed end of the mortised portion of the hub. When this cap B is forcibly pressed against the outer edges of the tenons of the spokes, by turning the nut D the tenons *e* will be forced into their mortises. It will thus be seen that should the spokes of the wheel become loose from any cause they can be readily tightened by simply screwing up the cap B; also, should any one or more of the spokes be broken new spokes can be conveniently substituted, even by an inexperienced person, and without removing the tire or any of the perfect spokes. If the tenons e on the spokes are made shorter than their mortises, any one or more of the spokes which may become loose can be readily tightened by the use of wedges of wood or metal driven into the spaces, which wedges or pieces will be safely confined in their places by means of the cap B. If the tenons e are of the same length as their mortises, and the bottoms of the latter are beveled, as shown in Fig. 2, then the ends of the tenons, as well as the shoulders $f\,f$, will afford solid bearings for the spokes in their hub. It will be seen from the above description that I tighten my wheel by expanding the fellies instead of contracting or shrinking a tire upon them.

What I claim as new, and desire to secure by Letters Patent, is—

A wheel-hub, having a portion, A, mortised to receive the spoke-tenons e, and a concentric beveled portion, A', a recessed cap, B, and a confining-nut, D, all combined substantially as described.

In testimony that I claim the above I have hereunto subscribed my name in the presence of two witnesses.

ROBERT M. BUCHANAN.

Witnesses:
GEORGE E. UPHAM,
ROBERT EVERETT.